US008155652B2

(12) United States Patent
Parekh et al.

(10) Patent No.: US 8,155,652 B2
(45) Date of Patent: Apr. 10, 2012

(54) TUNE-AWAY AND CROSS PAGING SYSTEMS AND METHODS

(75) Inventors: Nileshkumar J. Parekh, San Diego, CA (US); Faith Ulupinar, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/835,111

(22) Filed: Aug. 7, 2007

(65) Prior Publication Data

US 2008/0020769 A1    Jan. 24, 2008

Related U.S. Application Data

(63) Continuation of application No. 11/261,824, filed on Oct. 27, 2005.

(51) Int. Cl.
*H04W 36/00* (2009.01)
(52) U.S. Cl. ........ 455/436; 455/437; 455/438; 455/439; 455/440; 455/442; 455/444; 370/328; 370/329; 370/330; 370/331; 370/332; 370/333
(58) Field of Classification Search ................. 455/502, 455/436–444, 328, 329, 330, 331, 332, 333; 370/350, 329–333, 328
See application file for complete search history.

(56) References Cited

U.S. PATENT DOCUMENTS

| 5,260,943 | A | * | 11/1993 | Comroe et al. ............... 370/332 |
| 5,533,014 | A | | 7/1996 | Willars et al. |
| 5,640,679 | A | * | 6/1997 | Lundqvist et al. ............ 455/525 |
| 5,828,659 | A | | 10/1998 | Teder et al. |
| 6,067,442 | A | | 5/2000 | Wiedeman et al. |
| 6,069,880 | A | | 5/2000 | Owen et al. |
| 6,072,847 | A | | 6/2000 | Dupuy et al. |
| 6,097,709 | A | * | 8/2000 | Kuwabara ...................... 370/331 |
| 6,119,005 | A | * | 9/2000 | Smolik .......................... 455/436 |
| 6,122,270 | A | | 9/2000 | Whinnett et al. |
| 6,157,845 | A | | 12/2000 | Henry et al. |
| 6,181,943 | B1 | | 1/2001 | Kuo et al. |
| 6,195,551 | B1 | | 2/2001 | Kim et al. |
| 6,246,673 | B1 | * | 6/2001 | Tiedemann et al. .......... 370/333 |
| 6,282,420 | B1 | | 8/2001 | Bamburak et al. |
| 6,331,971 | B1 | | 12/2001 | Raith |

(Continued)

FOREIGN PATENT DOCUMENTS

CL            2901-2006           10/2006

(Continued)

OTHER PUBLICATIONS

Tomcik, J.: IEEE 802,20, "MBFFDD and MBTDD Wideband Mode: Technology Overview", Jan. 6, 2006. p. 1, 71-75, 105-107.

(Continued)

*Primary Examiner* — Olumide T Ajibade Akonai
(74) *Attorney, Agent, or Firm* — Donald C. Kordich

(57) ABSTRACT

Systems and methods are provided for processing wireless signal components for a mobile wireless access broadband service. This can include processes for measuring signal strength of an alternative frequency by tuning away from an existing frequency associated with an existing communications path. Such processes allow determining if the alternative frequency supports a subsequent communications path in a mobile broadband wireless application. Upon the determination, the process can automatically select the subsequent communications path based in part on the measured signal strength.

26 Claims, 10 Drawing Sheets

U.S. PATENT DOCUMENTS

| | | |
|---|---|---|
| 6,400,952 B2 | 6/2002 | Kim et al. |
| 6,466,803 B1 | 10/2002 | Gardner |
| 6,498,933 B1 | 12/2002 | Park et al. |
| 6,510,146 B1 | 1/2003 | Korpela et al. |
| 6,522,670 B1 * | 2/2003 | Jokinen et al. ............ 370/503 |
| 6,563,807 B1 * | 5/2003 | Kim et al. ............ 370/331 |
| 6,584,318 B2 * | 6/2003 | Hakalin et al. ............ 455/453 |
| 6,603,751 B1 | 8/2003 | Odenwalder |
| 6,608,818 B1 | 8/2003 | Abrol et al. |
| 6,614,769 B1 | 9/2003 | Erlick et al. |
| 6,665,281 B1 | 12/2003 | Kim |
| 6,668,170 B2 | 12/2003 | Costa et al. |
| 6,810,019 B2 | 10/2004 | Steudle |
| 6,822,948 B2 | 11/2004 | Bergstrom et al. |
| 6,829,481 B2 * | 12/2004 | Souissi ............ 455/436 |
| 6,845,238 B1 | 1/2005 | Muller |
| 6,891,812 B2 | 5/2005 | Bender |
| 6,934,526 B2 | 8/2005 | Choi et al. |
| 6,999,765 B2 * | 2/2006 | Hokao ............ 455/436 |
| 7,003,290 B1 | 2/2006 | Salonaho et al. |
| 7,020,108 B2 | 3/2006 | Virtanen |
| 7,024,194 B1 * | 4/2006 | Oksanen ............ 455/437 |
| 7,089,004 B2 | 8/2006 | Jeong et al. |
| 7,110,766 B1 | 9/2006 | Tayloe et al. |
| 7,133,702 B2 | 11/2006 | Amerga et al. |
| 7,151,756 B1 | 12/2006 | Park et al. |
| 7,324,479 B2 | 1/2008 | Hur |
| 7,336,951 B2 | 2/2008 | Choi et al. |
| 7,340,251 B1 * | 3/2008 | McClure ............ 455/434 |
| 7,363,039 B2 | 4/2008 | Laroia et al. |
| 7,367,424 B2 | 5/2008 | Brown et al. |
| 7,376,424 B2 * | 5/2008 | Kim et al. ............ 455/436 |
| 7,379,440 B2 | 5/2008 | Gopal |
| 7,382,750 B2 | 6/2008 | Wu |
| 7,409,214 B2 | 8/2008 | Lee |
| 7,415,272 B2 | 8/2008 | Khushu et al. |
| 2002/0003784 A1 | 1/2002 | Okabe et al. |
| 2002/0019231 A1 | 2/2002 | Palenius et al. |
| 2002/0187804 A1 | 12/2002 | Narasimha et al. |
| 2003/0003951 A1 | 1/2003 | Leprieur |
| 2003/0095513 A1 * | 5/2003 | Woodmansee et al. ....... 370/324 |
| 2003/0218995 A1 | 11/2003 | Kim et al. |
| 2003/0227946 A1 | 12/2003 | Schwarz et al. |
| 2004/0208140 A1 | 10/2004 | Noguchi et al. |
| 2004/0224696 A1 | 11/2004 | Korneluk et al. |
| 2005/0054368 A1 | 3/2005 | Amerga |
| 2005/0058151 A1 | 3/2005 | Yeh |
| 2005/0073977 A1 | 4/2005 | Vanghi et al. |
| 2005/0111358 A1 | 5/2005 | Hsu et al. |
| 2005/0122922 A1 | 6/2005 | Wu et al. |
| 2005/0192011 A1 | 9/2005 | Hong et al. |
| 2005/0216580 A1 | 9/2005 | Raji et al. |
| 2005/0252262 A1 | 11/2005 | Imai et al. |
| 2005/0272403 A1 | 12/2005 | Ryu et al. |
| 2006/0062180 A1 | 3/2006 | Sayeedi et al. |
| 2006/0166676 A1 | 7/2006 | Rajkotia et al. |
| 2006/0176870 A1 | 8/2006 | Joshi et al. |
| 2006/0223557 A1 | 10/2006 | Manohar |
| 2007/0030830 A1 | 2/2007 | Sagne et al. |
| 2007/0042717 A1 | 2/2007 | Alexiou et al. |
| 2007/0097922 A1 | 5/2007 | Parekh et al. |
| 2007/0097931 A1 | 5/2007 | Parekh et al. |
| 2007/0099614 A1 | 5/2007 | Parekh et al. |
| 2007/0099619 A1 | 5/2007 | Parekh et al. |
| 2007/0110022 A1 | 5/2007 | Palenius et al. |
| 2007/0218835 A1 | 9/2007 | Hindelang et al. |

FOREIGN PATENT DOCUMENTS

| | | |
|---|---|---|
| CL | 2903-2006 | 10/2006 |
| CL | 2904-2006 | 10/2006 |
| CL | 2907-2006 | 10/2006 |
| CL | 2908-2006 | 10/2006 |
| CN | 1176717 | 3/1998 |
| CN | 1379963 A | 11/2002 |
| CN | 1399855 | 2/2003 |
| CN | 1400835 A | 3/2003 |
| EP | 0696147 | 2/1996 |
| EP | 0948231 | 10/1999 |
| EP | 1030477 | 8/2000 |
| EP | 1117268 | 7/2001 |
| EP | 1467518 | 10/2004 |
| EP | 1467582 A1 | 10/2004 |
| JP | 10512728 | 12/1998 |
| JP | 11075237 A | 3/1999 |
| JP | 2001095031 | 4/2001 |
| JP | 2002528009 T | 8/2002 |
| JP | 2002541747 T | 12/2002 |
| JP | 2003032756 A | 1/2003 |
| JP | 2003506983 | 2/2003 |
| JP | 2003508991 T | 3/2003 |
| JP | 2004282557 | 10/2004 |
| JP | 2004343356 A | 12/2004 |
| JP | 2005500745 T | 1/2005 |
| JP | 2005101788 | 4/2005 |
| JP | 2005522119 T | 7/2005 |
| KR | 1020010024152 | 3/2001 |
| KR | 20010102418 | 11/2001 |
| KR | 0347415 | 7/2002 |
| KR | 1020020060391 | 7/2002 |
| RU | 218015902 | 2/2002 |
| RU | 2003125611 | 2/2005 |
| WO | 9429981 | 12/1994 |
| WO | 9616524 | 5/1996 |
| WO | WO9623369 A1 | 8/1996 |
| WO | 9632821 | 10/1996 |
| WO | 9923844 | 5/1999 |
| WO | 9943178 | 8/1999 |
| WO | 0022837 | 4/2000 |
| WO | WO0041429 A1 | 7/2000 |
| WO | WO0060895 | 10/2000 |
| WO | WO0111914 | 2/2001 |
| WO | 0120942 | 3/2001 |
| WO | WO0117307 A1 | 3/2001 |
| WO | 0239758 | 5/2002 |
| WO | WO03017596 A2 | 2/2003 |
| WO | WO03084253 A1 | 10/2003 |
| WO | 2004091231 A1 | 10/2004 |

OTHER PUBLICATIONS

Tomcik. J. "MDFDD and MBTDD Wideband Mode: Technology Overview," (Oct. 2005), pp. 1-109.

Turner, S. et al.: "CDMA2000 Hybrid Access Terminal Operation White Paper," (Apr. 2001), pp. 1-25.

International Search Report—PCT/US06/042054—International Search Authority, European Patent Office, Jun. 14, 2007.

Written Opinion—PCT/US06/042054—International Search Authority. European Patent Office, Jun. 14, 2007.

International Preliminary Report on Patentability—PCT/US06/042054—The International Bureau of WIPO, Geneva, Switzerland—Apr. 29, 2008.

Universal Mobile Telecommunications System (UMTS), ETSI Standards, European Telecommunications Standards Institute, Sophia-Antipo, FR, No. v601, Apr. 2004, pp. 15-31, XP002338707.

Taiwanese Search report—095139896—TIPO—Dec. 28, 2010.

UMTS; RadIo Resource Management Strategies, ETSI TR 25.922 V3.6.0 (Sep. 2001).

* cited by examiner

TUNE-AWAY AND CROSS PAGING SYSTEMS AND METHODS

REFERENCE TO CO-PENDING APPLICATIONS FOR PATENT

This application is a continuation of U.S. application Ser. No. 11/261,824 filed Oct. 27, 2005, entitled TUNE-AWAY AND CROSS PAGING SYSTEMS AND METHODS.

The present Application for Patent is related to the following co-pending U.S. Patent Applications: entitled, "RESOURCE ALLOCATION DURING TUNE-AWAY", filed concurrently herewith, assigned to the assignee hereof, and expressly incorporated by reference herein; entitled, "INTER-FREQUENCY HANDOFF", filed concurrently herewith, assigned to the assignee hereof, and expressly incorporated by reference herein; entitled, "TUNE-AWAY PROTOCOLS FOR WIRELESS SYSTEMS", filed concurrently herewith, assigned to the assignee hereof, and expressly incorporated by reference herein; entitled, "MOBILE WIRELESS ACCESS SYSTEM," filed concurrently herewith, assigned to the assignee hereof, and expressly incorporated by reference herein.

BACKGROUND

I. Field

The subject technology relates generally to communications systems and methods, and more particularly to systems and methods that enable communications channels to be tuned to an alternative sector in order to determine alternative frequencies or technologies that facilitate further communications in a mobile wireless communications setting.

II. Background

Wireless companies are constantly improving next-generation networks that combine voice and data on cellular networks, for example. Collectively, these companies have spent billions on licenses and equipment to provide a broad array of new data-centric services for customers. But emerging technologies could offer a leap past so-called third-generation systems just as they are beginning to emerge. One such technology is based on the IEEE 802.20 standard, a member of the 802 family that includes the better-known 802.11b, or Wi-Fi. The Wi-Fi LAN (local area network) standard has proliferated in recent years by offering broadband wireless connections for laptops and other mobile devices.

A new standard could change the direction of wireless networking, though. Whereas Wi-Fi and the newer 802.16 metro-area wireless broadband system are limited by the range of coverage areas—from a few hundred feet to 30 miles or so, respectively whereas 802.20 sits on existing cellular towers. It essentially promises the same coverage area as a mobile phone system with the speed of a Wi-Fi connection. This may account for why 802.20, or mobile broadband wireless access (MBWA), has generated interest regarding potential new applications.

One differentiating factor for these new applications is that they provide full mobility and nationwide coverage through cell-to-cell handoff with access to broadband speeds for any application. Thus, business travelers, for example, can access corporate networks while on the move and send information in real-time back to the office—just as if they were connected to the local area network at their respective office. In some cases, users get the same broadband Internet experience they have with a DSL or cable modem connection, but in a cellular mobile environment. The average speed of 1.5 Mb per user—or 3 Mbps peak data rates is much greater than offered by conventional systems.

One aspect for employing mobile broadband wireless access technologies is the concept of an active set and related protocol for managing communications between an access terminal such as a cell phone and an access network or access point such as a base station. A default Active Set Management Protocol provides the procedures and messages used by the access terminal and the access point to keep track of the access terminal's approximate location and to maintain the radio link as the access terminal moves between coverage areas of different sectors. In general, the Active Set is defined as a set of Pilots or Sectors with allocated MACID for an access terminal. The Active Set members can be synchronous or asynchronous with respect to each other. The access terminal can generally switch its serving Sector at any time among these Active Set member Sectors.

A Synchronous Subset of an Active Set consists of sectors that are synchronous with each other. Moreover, the subset is a maximal subset, i.e., generally all sectors that are synchronous with the sectors in this subset are contained in this subset. The different Synchronous Subsets ASSYNCH can be constructed using a last instance of an Active Set Assignment message, for example. Transmission from the access terminal to two different Synchronous Subsets of the active set is considered independent of each other. For example, the access terminal reports CQI to a Synchronous Subset of sectors independent of any other Synchronous Subset. One area that is of important concern is how communications are handed off between frequencies on a communications channel and/or between communications technologies that may be different between component of a given mobile broadband wireless access system.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided that facilitate wireless communications between wireless devices, between stations for broadcasting or receiving wireless signals, and/or combinations thereof. In one embodiment, inter-frequency and inter-radio access technology tune-away mechanisms are provided that facilitate communications in a mobile broadband wireless access system. These mechanisms are provided in a connected mode where there are on-going communications of a given channel. In general, in order to support such mobile communications applications without having to employ dual receivers for sampling and locating alternative communications paths, the tune away mechanism allows an access terminal to dynamically cooperate with an access network to determine potential communications paths to continue a particular session.

As conditions change, the tune away mechanism allows the current communications channel to be tuned to a subsequent frequency in order to determine properties of an alternative communications path such as signal strength of the path. The tune away condition provides a temporary sampling of alternative paths while mitigating disruptions to current communications. Such sampling allows determining which potential frequencies may be employed for future communications as conditions change such as when a mobile device moves from one point to another. In another embodiment, tune away may be employed to facilitate communications between differing communications technologies or protocols employed in wireless applications. For example, an existing wireless protocol may be employed for a current session but as conditions change such as movement away from one access point toward another, it may be desirable to change the actual technology or communications protocol employed to facilitate future communications. In this case, tune away is provided to support inter radio access technology (inter-RAT) applications.

In addition, there is a need to receive Page messages for other communication system while in connected mode in a communication system. This may be needed if other communication systems provide a user service (for example circuit switched voice or short message service) that is unavailable in the currently connected communication system. The other communication system may or may not be synchronous in time to the currently connected communication system. The tune away mechanism allows the currently connected communication channel to be tuned to a subsequent communication channel on a different technology in order to listen for the paging channel for that technology. Alternatively, an Inter RAT Protocol allows cross paging between the two communication systems by means of tunneling registration and page message for a different technology in an Inter RAT Blob message in the currently connected communication system.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Systems and methods are provided for processing wireless signal components for a mobile wireless access broadband service. This can include processes for measuring signal strength of an alternative frequency by tuning away from an existing frequency associated with an existing communications path. Such processes allow determining if the alternative frequency supports a subsequent communications path in a mobile broadband wireless application. Upon the determination, the process can automatically select the subsequent communications path based in part on the measured signal strength. By tuning away in this manner to determine alternative communications channels, both inter-frequency handoff applications and inter radio access technology handoffs can be achieved to support a broad range of wireless applications.

As used in this application, the terms "component," "mechanism," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
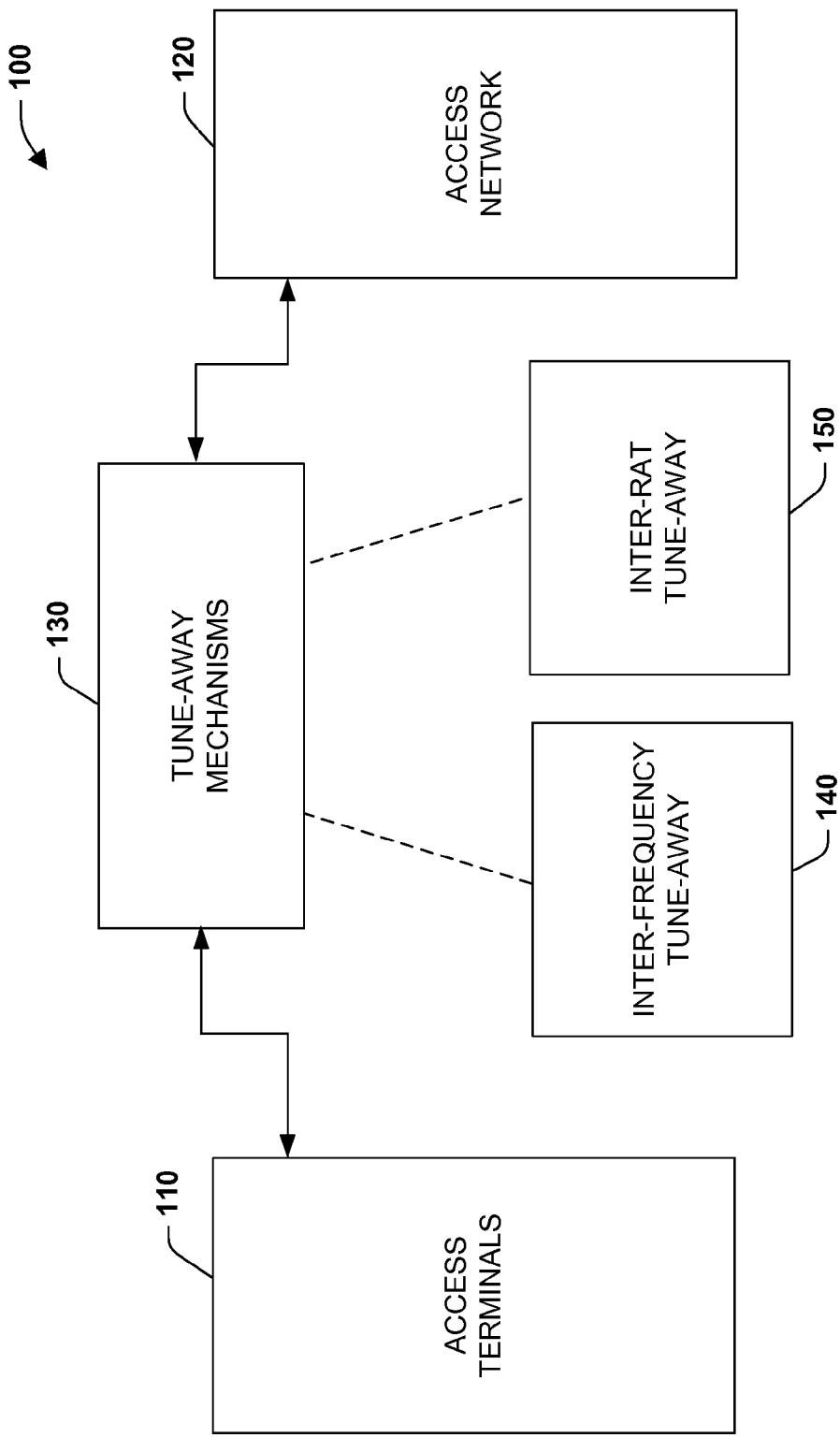
FIG. 1 is a schematic block diagram illustrating a mobile broadband wireless access system.

FIG. 1 illustrates a mobile broadband wireless access system 100. The system 100 includes one or more access terminals 110 that communicate between terminals 110 an in accordance with an access network 120, where an access network are the connections and associated electronic components that link a core network to points of presence (POP) and on to Points of Interconnect (POI) switch locations. Such terminals 110 can include substantially any type of communicating device such as a cell phone, computer, personal assistant, hand held or laptop devices, and so forth. In general, the access terminals 110 are in a mobile situation where communicating according to one particular access network 120 may not always be possible. Thus, one or more tune-away mechanisms 130 can be provided to facilitate communications between such terminals 110. The tune-away mechanisms basically allow the terminals 110 and nodes 120 to determine alternative communications paths by temporarily tuning away from an existing path and sampling a subsequent path for suitable employment in on-going communications. For example, a signal strength may be measured on an alternative frequency while tuning away from a current frequency employed for communications. If a suitable signal threshold is detected, the alternative frequency can be automatically selected for future communications. As illustrated, tune-away mechanisms can be provided to support inter-frequency tune-away applications at 140 and/or support inter radio access technology (inter-rat) applications at 150.

To facilitate inter-frequency handoff between communications channels at 140, an Active Set is extended to include members from one or more frequencies. This implies that the Active Set consists of Sectors from one or more frequencies. The Sector from different frequencies may be synchronous or asynchronous with respect to each other. To facilitate adding another frequency sector into the Active Set, the mobile broadband wireless access system 100 provides the ability for the access network 120 to specify other frequency neighbors in a sector parameters message specified in an overhead messages protocol. This includes the ability for the active terminal 110 to report other frequency Sector Pilot strength in a Pilot Report message specified in an Active Set Management Protocol. Another aspect includes the ability for access network 120 to specify other frequency members in an Active Set Assignment message specified in the Active Set Management Protocol.

Generally, in order to report other frequency Sector Pilot strength, the active terminal 110 takes measurements at various times and intervals. In an Idle mode where no on-going communications are detected, it is straight-forward since the receiver is available for other frequency measurements. In order to report Pilot strength in Connected Mode, either dual receivers or temporary tune-away mechanism 130 is provided. Since one can not always assume availability of dual receivers, the tune-away mechanism 130 is provided to facilitate determination of alternative communications paths. Furthermore, similar tune-away mechanisms 130 are also provided for inter-RAT handoff 150 and listening for Pages for another technology that may be asynchronous to the mobile broadband wireless access (MBWA) system 100.

As noted above, the MBWA system 100 supports Idle and Connected Mode Inter-RAT Handoff. The tune-away mechanisms 130 are provided to facilitate handoff from MBWA system to other radio access technologies as well. The system design assumes that the handoff policy for Inter-RAT Handoff reside in the access terminal 110 but other architectures are possible. In other words, the trigger for measurement of other technology and the handoff decision algorithm generally reside in the access terminal 110.

For inter-rat 150 technologies, the same tune-away mechanisms can be employed as provided for the Inter-frequency handoff to measure other radio access technology Pilot signals. In addition, a Sector Parameters message in an Overhead Messages Protocol provides ability to send other technology Neighbor List. These two mechanisms provide the access terminal with the ability to find other radio access technologies in the neighborhood, and measure the Pilots for other technologies.

In another embodiment, the MBWA system 100 supports reception of Page messages for other radio access technologies. There are typically two distinct mechanisms provided although other configurations are possible. In one case, tune-away mechanism 130 receives pages for other systems. In another case, an inter RAT Protocol in a Session layer provides sending an Inter RAT Blob (binary large object) message from the access terminal 110 or the access network 120. The first case is useful when the MBWA system 100 has no integration in a core network with the other radio access technologies. Hence, one way to get a Page message from the other technology is by listening to its Paging Channel. The tune away mechanism 130 supports tuning away for listening to paging channels at very specific times in other radio access technologies that are both synchronous and asynchronous to the MBWA system 100.

In general, the tune-away mechanism 130 can be employed to sample frequencies by having timing knowledge of both the access terminals 110 and the access networks 120. This can include being able to sample technologies in a manner that enables mitigating missing pages from a purely random sample since the system can determine sampling times that account for synchronous and asynchronous timing differences between terminals 110 and nodes 120. For example, this can include providing sampling schedules that are outside of a frequency frame or allow sampling within a sector.

Figure 2:
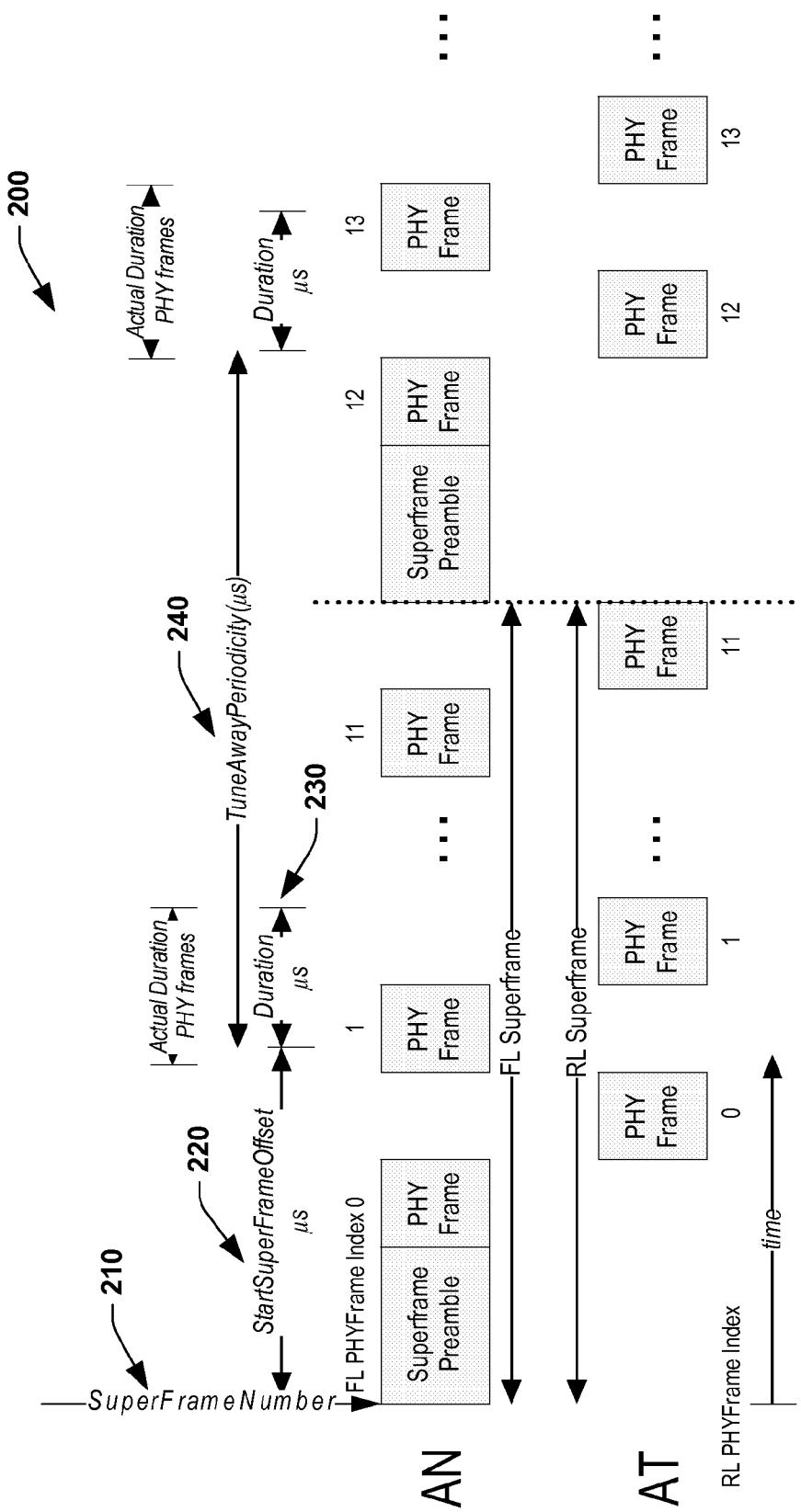
FIG. 2 is an example timing diagram for a tune-away component.

FIG. 2 illustrates an example timing diagram 200 for a tune-away component. A tune away mechanism or component generally consists of a tune away schedule and tune away control. A Tune Away Schedule N attribute parameter provides a component to communicate tune away schedule(s) between access terminals and access points or nodes. An example tune-away timing schedule is depicted in the diagram 200. In this schedule 200, it is assumed that the first tune away occurred during a Super frame defined by a Super frame Number 210 provided in a Tune Away Schedule N parameter. Furthermore, more refined time of a first tune away is a Start Super frame Offset parameter 220 e.g. microseconds from the beginning of the Super frame identified at 210. A Tune Away Duration 230 is how long in microseconds the access terminal tunes away. A Tune Away Periodicity parameter 240 determines the time between the start of successive tune away in units of microsecond. The access terminal can negotiate one or more tune away schedules if desired. More than one schedule may be needed for example to monitor pages of one system and also tuning away for inter-frequency handoffs.

The tune-away control mechanism described above provides at least two functions including: Enable/Disable tune-away, and providing time correction to the tune away schedule. The access terminal can Enable or Disable tune away schedules at substantially any time. Furthermore, the access terminal can Enable or Disable more than one schedule at the same time. The time corrections are typically provided for time critical tune-away to receive pages for a system that is asynchronous to MBWA system. In this example, whenever a new sector is added to an active set, the access terminal provides a correction factor, Sector Offset in units of microseconds to correct time so that the access terminal tunes away at the right time in the other system to receive a page. A Tune Away Request parameter and Tune Away Response messages in a Default Connected State Protocol provides a mechanism to reliably enable/disable tune-away or provide time correction for any Sector in the Active Set.

Figure 3:
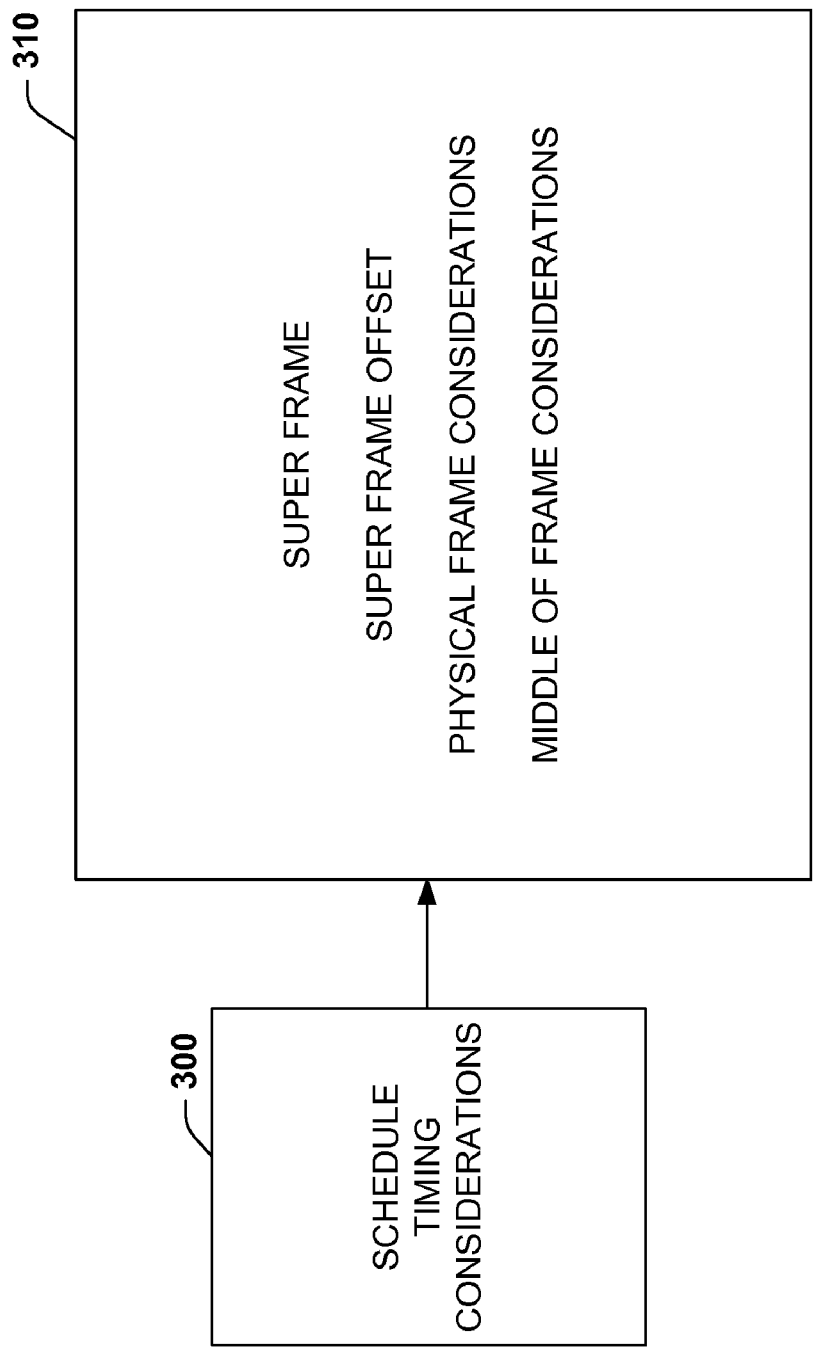
FIG. 3 is a diagram illustrating schedule timing considerations.

FIG. 3 illustrates example schedule timing considerations 300. At 310, some example schedule considerations are provided. For instance at 310, if a tune-away begins or ends in middle of a PHY Frame, a general rule is to tune away for an entire Frame. Referring briefly back to FIG. 2, a Super frame begins at 210 and basically starts with a Super frame preamble data packet followed by a series of PHY frames (e.g., 1 Super frame=1 preamble followed by 12 PHY frames). Super frame boundary considerations can include if a tune-away period causes the access terminal to miss a system information block, the access terminal shall maintain tune-away for the validity period of the system information block which can be set for different times if desired. In one embodiment, the validity period can be set for two super frames although other settings can be employed.

FIGS. 4-8, illustrate tune-away processes for wireless signal processing. While, for purposes of simplicity of explanation, the methodologies are shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

Figure 4:
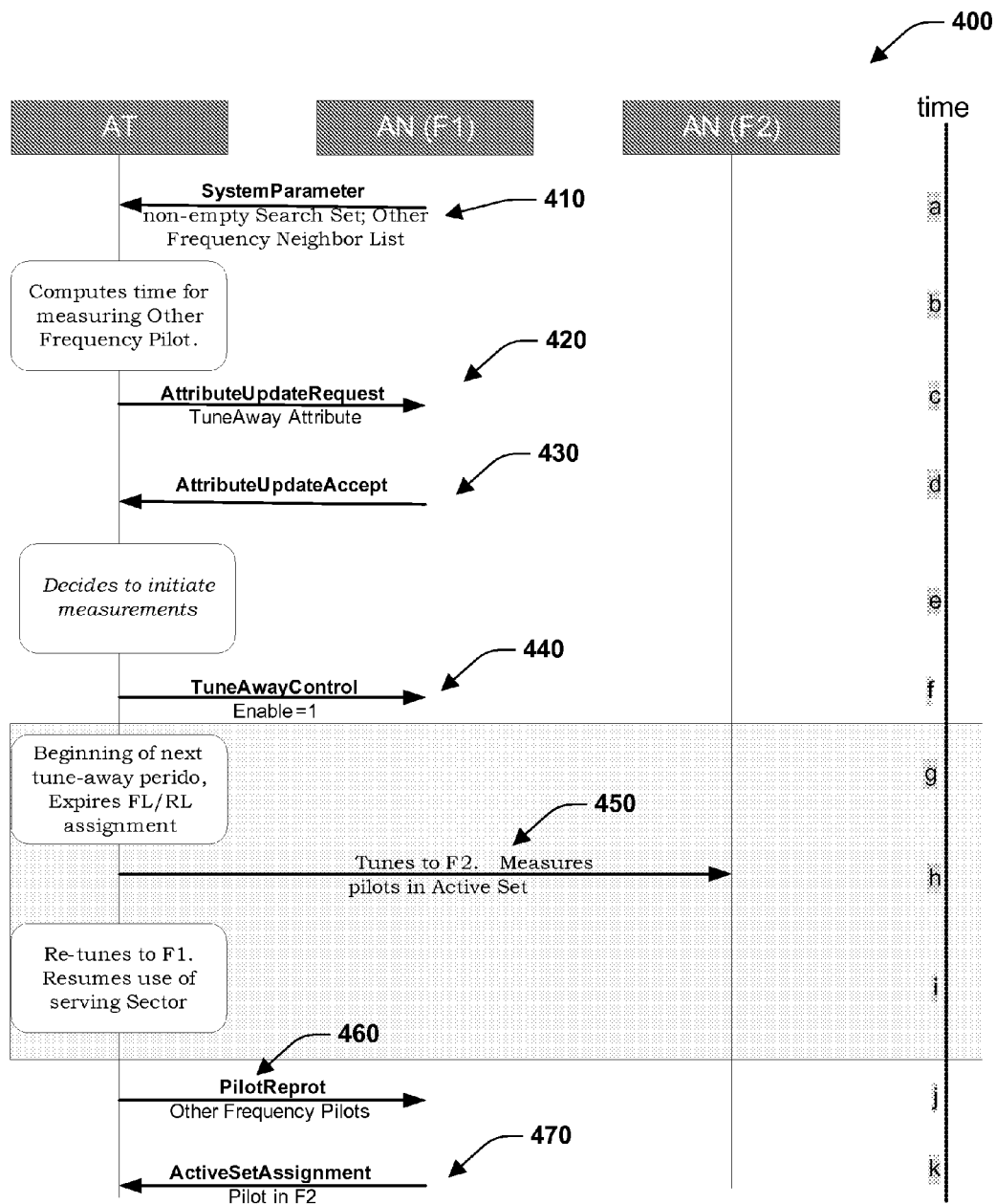
FIG. 4 is a schematic block diagram illustrating an inter-frequency tune-away process.

FIG. 4 illustrates a message flow 400 for inter-frequency tune-away and handoff between frequencies. At 410, a system parameter is passed from an access network (network) indicating a frequency neighbor list. An access terminal computes a time for measuring another frequency pilot and updates a tune away attribute at 420. An attribute update accept handshake is performed at 430, where a decision to initiate alternative frequency measurements is made and a tune away control bit if set to enable at 440. Proceeding to 450, the access terminal tunes away to an alternative frequency at the beginning of the next tune-away period and re-tunes to the existing frequency after performing such measurement. At 460, an indication of a potential pilot frequency or pilots is made to the access network. At 470, the active node selects an alternative frequency for the pilot based upon the previous measurements at 450.

Figure 5:
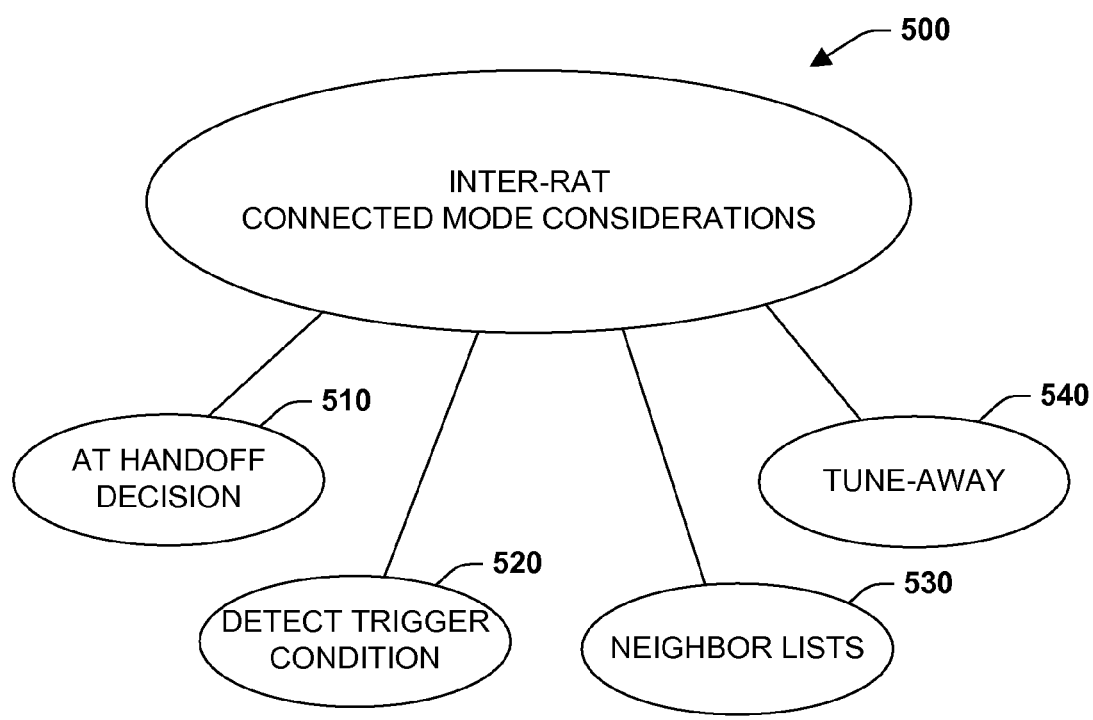
FIG. 5 is a diagram illustrating connected mode considerations for inter-radio access technology handoff and tune-away.

FIG. 5 illustrates one or more inter radio access technology considerations 500 for connected mode. At 510, an access terminal makes a handoff decision between one technology and a subsequent one. A Handoff Policy is generally implemented at the access terminal, whereas the access network may assist in the Handoff process. This can include providing other RAT Neighbor Lists and facilitating tune-away detection processes. At 520, the access terminal detects a trigger condition such as detecting that signal quality on a current channel is below a pre-determined threshold. To start measuring the other technology a command can be sent to measure a Current Active Set Pilot Strength which can include other triggers as well. To handoff to the other technology, the Current Active Set Pilot Strength is determined, another RAT Pilot Strength is determined, and any other trigger employed to enable the handoff. At 530, one or more other RAT Neighbor Lists may be employed. This can include processing an Overhead Message Protocol, a Sector Parameters Message, or other RAT neighbor lists as described above. At 540, a tune-away procedure can be initiated to measure other Frequency Pilots which is similar in nature to the Inter-Frequency Handoff procedures described above.

Figure 6:
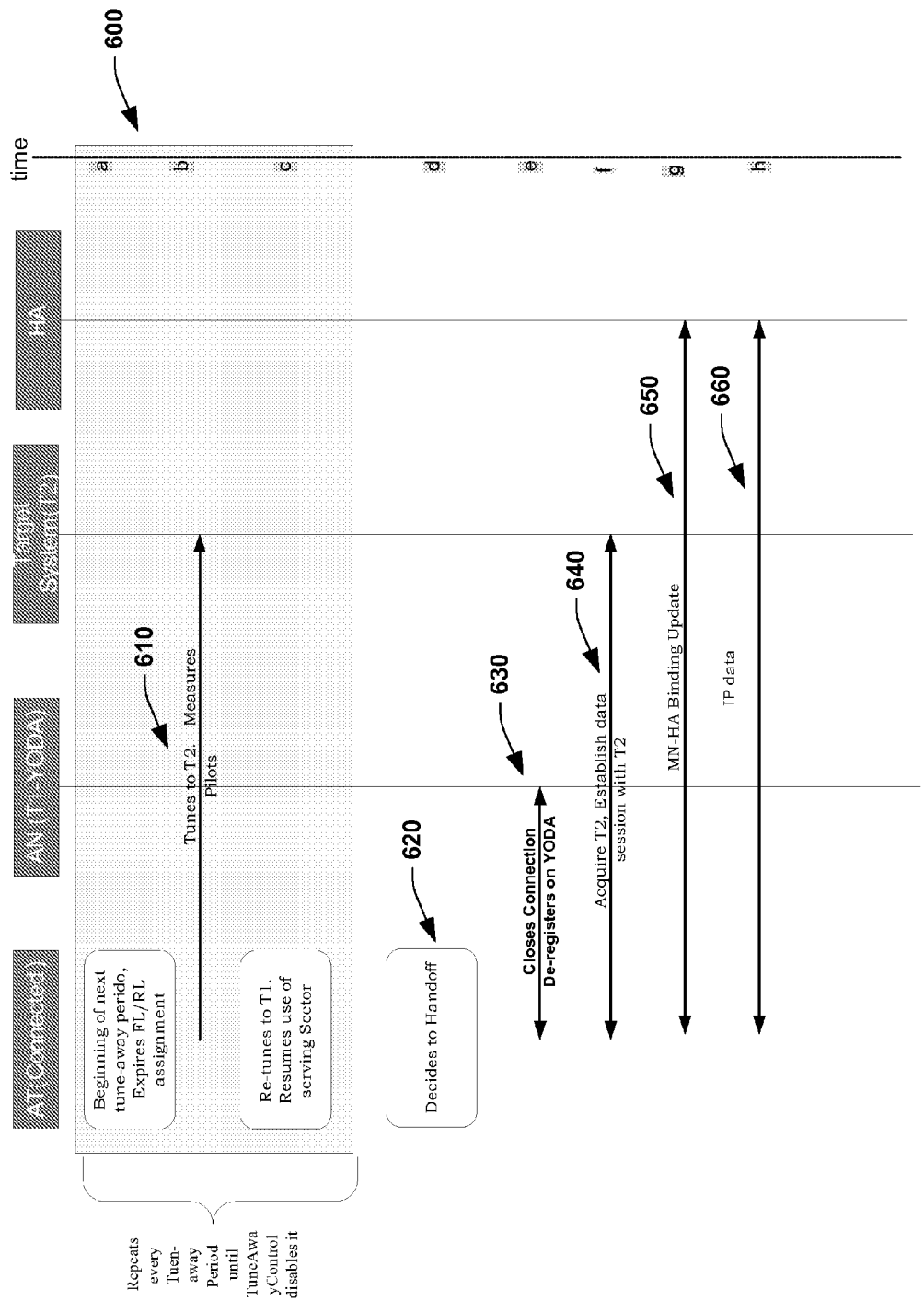
FIG. 6 is a flow diagram illustrating an inter-radio access technology handoff process.

FIG. 6 is a flow diagram illustrating a message flow process for an inter-RAT handoff in connected mode. A neighbor list can be passed from a first technology system to an access terminal. The access terminal computes a tune away schedule for measuring other frequency pilots and issues an attribute update request as noted above with respect to FIG. 4. An attributes accepted flag is sent to the access terminal where a decision is made to initiate a tune-away measurement, and where the access terminal indicates that it wants to tune away to measure other technology. At 610, a tune-away is initiated to a subsequent communications technology. A signal strength measurement can be obtained during the measurement. If a suitable measurement is found, the access terminal can switch from an existing or current protocol to a subsequent protocol.

This procedure can be initiated at pre-determined tune-away intervals and can be disabled as desired. At 620, a decision to handoff from one communications technology to another is made. At 630, a connection is first closed with the existing communications technology. At 640, a data session is established with a subsequent communications nchannel or technology. At 650, a Mobile IP binding update is performed, where Internet Protocol Data or other protocol is exchanged at 660.

Figure 7:
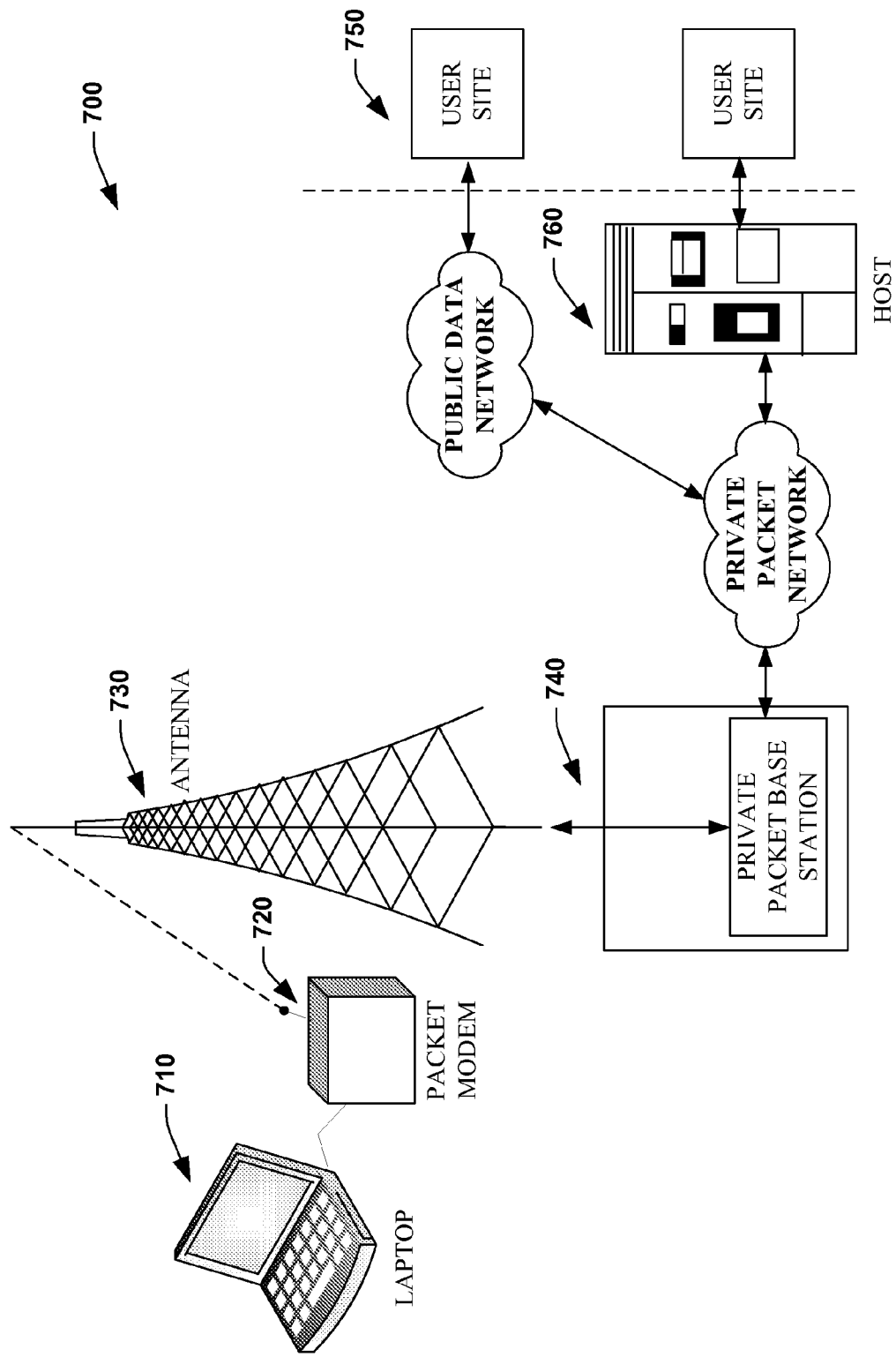
FIG. 7 illustrates an example system for employing signal processing components.

FIG. 7 illustrates an example system 700 for employing wireless signal processing components. The system 700 illustrates some of the various example components that may employ the tune-away components described above. These can include a personal computer 710, a modem 720 that collectively communicate over an antenna 730. Communications may proceed through a base station 740 that communicates over private or public networks to one or more user sites 750 (or devices). Also, one or more host computers 760 may be employed to facilitate communications with the other respective components in the system 700. The system 700 can employ various standards and protocols to facilitate communications.

Figure 8:
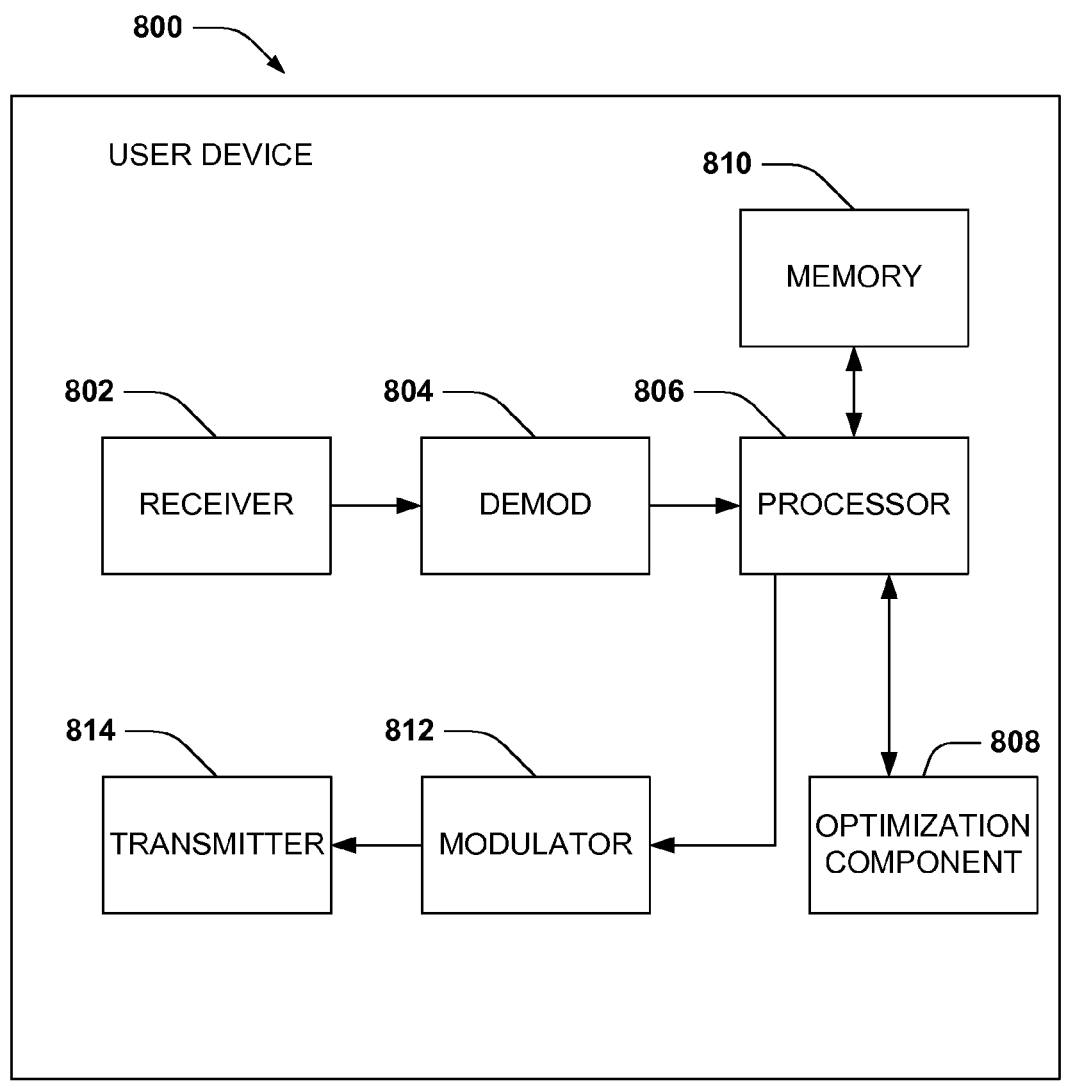
FIGS. 8 and 9 illustrate exemplary wireless communications systems that can be employed with the signal processing components.

FIG. 8 illustrates a system 800 that can be utilized in connection with a tune-away. System 800 comprises a receiver 802 that receives a signal from, for instance, one or more receive antennas, and performs typical actions thereon (e.g., filters, amplifies, downconverts, . . . ) the received signal and digitizes the conditioned signal to obtain samples. A demodulator 804 can demodulate and provide received pilot symbols to a processor 806 for channel estimation.

Processor 806 can be a processor dedicated to analyzing information received by receiver component 802 and/or generating information for transmission by a transmitter 814. Processor 806 can be a processor that controls one or more portions of system 800, and/or a processor that analyzes information received by receiver 802, generates information for transmission by a transmitter 814, and controls one or more portions of system 800. System 800 can include an optimization component 808 that can optimize allocation of resources during a tune-away. Optimization component 808 may be incorporated into the processor 806. It is to be appreciated that optimization component 808 can include optimization code that performs utility based analysis in connection with assigning user devices to beams. The optimization code can utilize artificial intelligence based methods in connection with performing inference and/or probabilistic determinations and/or statistical-based determination in connection with optimizing user device beam assignments.

System (user device) 800 can additionally comprise memory 810 that is operatively coupled to processor 806 and that stores information such as assignment information, scheduling information, and the like, wherein such information can be employed with allocating resources during a tune-away procedure. Memory 810 can additionally store protocols associated with generating lookup tables, etc., such that system 800 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the subject systems and methods is intended to comprise, without being limited to, these and any other suitable types of memory. The processor 806 is connected to a symbol modulator 812 and transmitter 814 that transmits the modulated signal.

Figure 9:
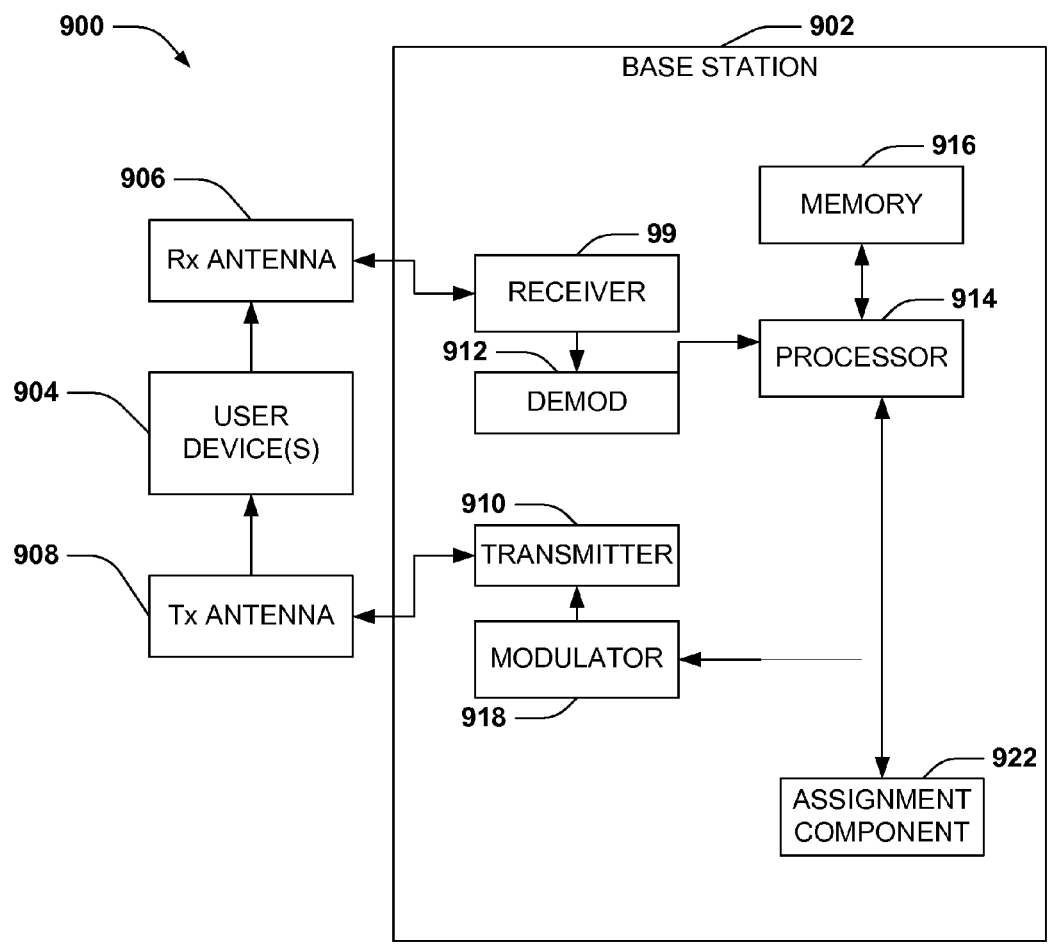

FIG. 9 illustrates a system that may be utilized in connection with performing a tune-away and/or allocating resources during a tune-away. System 900 comprises a base station 902 with a receiver 910 that receives signal(s) from one or more user devices 904 via one or more receive antennas 906, and transmits to the one or more user devices 904 through a plurality of transmit antennas 908. In one example, receive antennas 906 and transmit antennas 908 can be implemented using a single set of antennas. Receiver 910 can receive information from receive antennas 906 and is operatively associated with a demodulator 912 that demodulates received information. Receiver 910 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 914 that is similar to the processor described above with regard to FIG. 8, and is coupled to a memory 916 that stores information related to user device assignments, lookup tables related thereto and the like. Receiver output for each antenna can be jointly processed by receiver 910 and/or processor 914. A modulator 918 can multiplex the signal for transmission by a transmitter 920 through transmit antennas 908 to user devices 904.

Base station 902 further comprises an assignment component 922, which can be a processor distinct from or integral to processor 914, and which can evaluate a pool of all user devices in a sector served by base station 904 and can assign user devices to beams based at least in part upon the location of the individual user devices.

Figure 10:
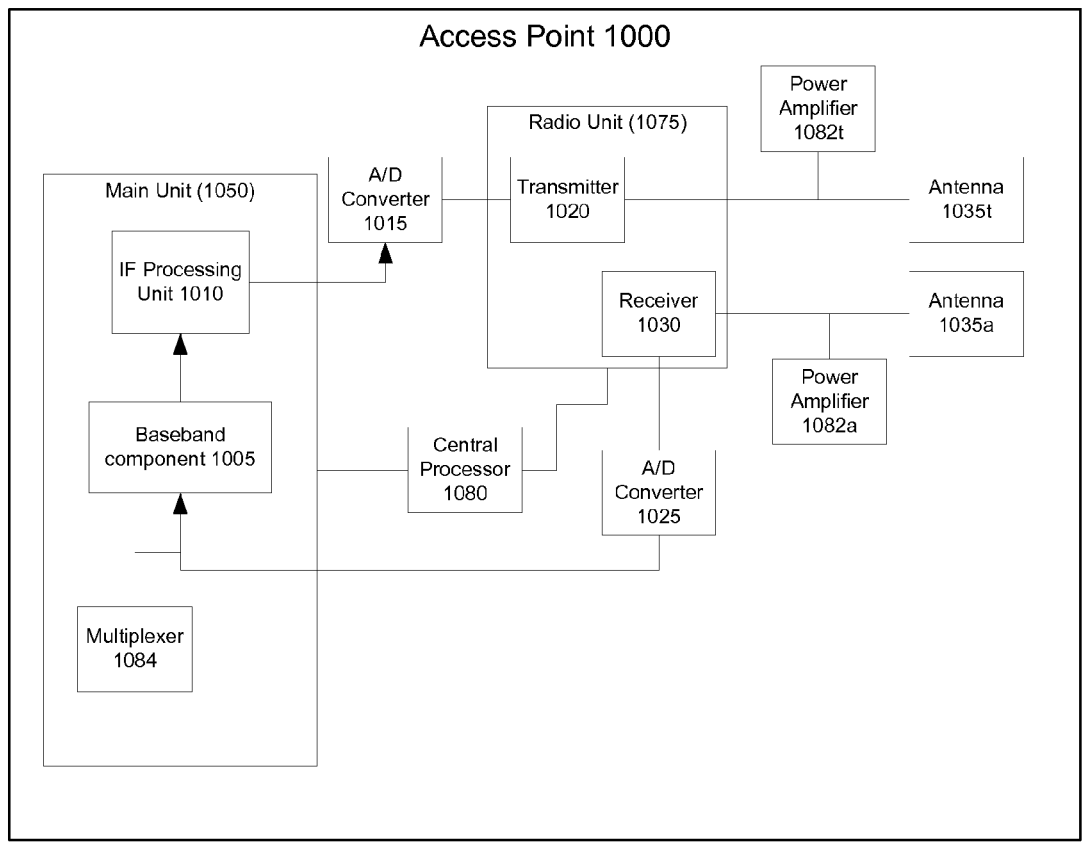
FIG. 10 is an illustration of an access point system.

As shown in FIG. 10, a radio access point can comprise a main unit (MU) 1050 and a radio unit (RU) 175. MU 1050 includes the digital baseband components of an access point. For example, MU 1050 can include a baseband component 1005 and a digital intermediate frequency (IF) processing unit 1010. Digital IF processing unit 1010 digitally processes radio channel data at an intermediate frequency by performing such functions as filtering, channelizing, modulation, and so forth. RU 1075 includes the analog radio parts of the access point. As used herein, a radio unit is the analog radio parts of an access point or other type of transceiver station with direct or indirect connection to a mobile switching center or corresponding device. A radio unit typically serves a particular sector in a communication system. For example, RU 1075 can include one or more receivers 1030 connected to one more antennas 1035a-t for receiving radio communications from mobile subscriber units. In an aspect, one or more power amplifiers 1082 a-t are coupled to one or more antennas 1035 a-t. Connected to receiver 1030 is an analog-to-digital (A/D) converter 1025. A/D converter 1025 converts the analog radio communications received by receiver 1030 into digital input for transmission to baseband component 1005 via digital IF processing unit 1010. RU 1075 can also include one or more transmitter 120 connected to either the same or different antenna 1035 for transmitting radio communications to access terminals. Connected to transmitter 1020 is a digital-to-analog (D/A) converter 1015. D/A converter 1015 converts the digital communications received from baseband component 1005 via digital IF processing unit 1010 into analog output for transmission to the mobile subscriber units. In some embodiments, a multiplexer 1084 for multiplexing of multiple-channel signals and multiplexing of a variety of signals including a voice signal and a data signal. A central processor 1080 is coupled to main unit 1050 and Radio Unit for controlling various processing which includes the processing of voice or data signal.

It is to be understood that the embodiments described herein may be implemented by hardware, software, firmware, middleware, microcode, or any combination thereof For a hardware implementation, the processing units within an access point or an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for an access terminal to process wireless signal components for a mobile wireless access broadband service, comprising: generating a schedule that describes frame structure timing of a first communications channel; tuning the access terminal away from the first communications channel temporarily to determine timing differences with at least a second communications channel in accordance with the schedule; generating a correction time factor between the first communications channel and the second communications channel to facilitate handing off communications between the channels; and tuning the access terminal away from the first communications channel at a time based on the correction time factor to receive at least one page on the second communications channel.

2. The method of claim 1, further comprising providing at least one tune-away mechanism at the access terminal to perform the tuning away from the first communications channel temporarily, the tune-away mechanism supporting one or more technology types.

3. The method of claim 2, wherein the tune-away mechanism supports inter-frequency handoff within the same technology type.

4. The method of claim 2, wherein the tune-away mechanism supports an inter-radio access technology handoff.

5. The method of claim 1, further comprising measuring a signal strength based in part on a signal threshold.

6. The method of claim 1, further comprising extending an Active Set of parameters that include members from one or more frequencies, where the Active Set includes Sectors from the one or more frequencies.

7. The method of claim 6, further comprising processing the Sectors from different frequencies that are synchronous or asynchronous with respect to each sector.

8. The method of claim 1, further comprising installing a handoff policy for an Inter-RAT (Radio Access Technology) Handoff in the access terminal.

9. The method of claim 8, further comprising triggering a measurement of other communication technology from the access terminal.

10. The method of claim 8, further comprising triggering a handoff decision from the access terminal.

11. The method of claim 10, further comprising passing a Neighbor List of frequencies between the access terminal and at least one access network.

12. An access terminal for processing wireless signal components for a mobile wireless access broadband service, comprising: means for generating a schedule that describes flame structure timing of a first communications channel; means for tuning the access terminal away from the first communications channel temporarily to determine timing differences with at least a second communications channel in accordance with the schedule; means for generating a correction time factor between the first communications channel and the second communications channel to facilitate handing off communications between the channels; and means for tuning the access terminal away from the first communications channel at a time based on the correction time factor to receive at least one page on the second communications channel.

13. The access terminal of claim 12, wherein the means for tuning the access terminal away supports inter-frequency handoff within the same technology type.

14. The access terminal of claim 12, wherein the means for tuning the access terminal away supports an inter-radio access technology handoff.

15. The access terminal of claim 12, further comprising means for triggering a measurement of other communication technology from the access terminal.

16. The access terminal of claim 15, further comprising means for triggering a handoff decision from the access terminal.

17. An access terminal for processing wireless signal components for a mobile wireless access broadband service, comprising: a memory configured to store a schedule that describes flame structure timing of a first communications channel; and a processor configured to tune the access terminal away from the first communications channel temporarily to determine timing differences with at least a second communications channel in accordance with the schedule, and to generate a correction time factor between the first communications channel and the second communications channel to facilitate handing off communications between the channels, wherein the processor is further configured to tune the access terminal away from the first communications channel at a time based on the correction time factor to receive at least one page on the second communications channel.

18. The access terminal of claim 17, wherein the processor is further configured to support inter-frequency handoff within the same technology type.

19. The access terminal of claim 17, wherein the processor is further configured to support an inter-radio access technology handoff.

20. The access terminal of claim 17, wherein the processor is further configured to trigger a measurement of other communication technology from the access terminal.

21. The access terminal of claim 20, wherein the processor is further configured to trigger a handoff decision from the access terminal.

22. A non-transitory computer-readable storage medium comprising code, which, when executed by an access terminal, cause the access terminal to perform operations for processing wireless signal components for a mobile wireless access broadband service, the computer-readable storage medium comprising: code for generating a schedule that describes frame structure timing of a first communications channel; code for tuning the access terminal away from the first communications channel temporarily to determine timing differences with at least a second communications channel in accordance with the schedule; code for generating a correction time factor between the first communications channel and the second communications channel to facilitate handing off communications between the channels; and code for tuning the access terminal away from the first communications channel at a time based on the correction time factor to receive at least one page on the second communications channel.

23. The access terminal of claim 22, wherein the code for tuning the access terminal away supports inter-frequency handoff within the same technology type.

24. The access terminal of claim 22, wherein the code for tuning the access terminal away supports an inter-radio access technology handoff.

25. The access terminal of claim 22, further comprising code for triggering a measurement of other communication technology from the access terminal.

26. The access terminal of claim 25, further comprising code for triggering a handoff decision from the access terminal.

* * * * *